W. H. BOUTELLE.
OPHTHALMIC MOUNTING.
APPLICATION FILED APR. 29, 1919.
1,318,836.
Patented Oct. 14, 1919.
2 SHEETS—SHEET 1.
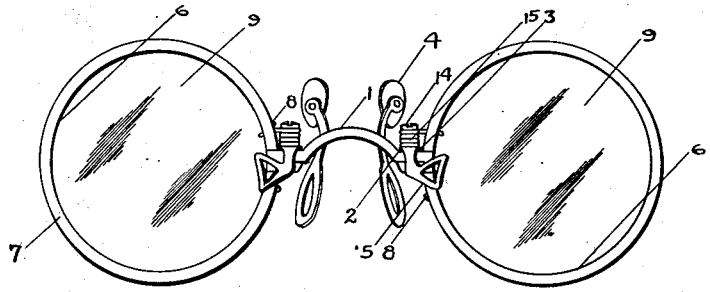
FIG. I
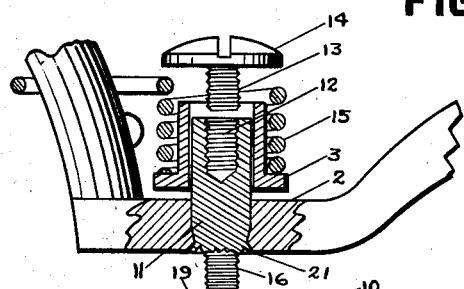
FIG. II
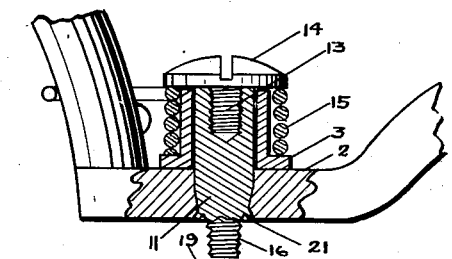
FIG. III
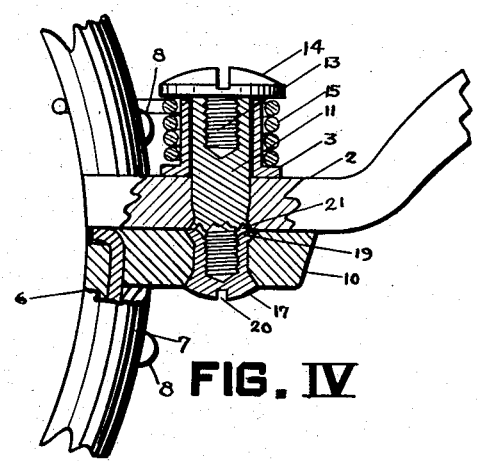
FIG. IV
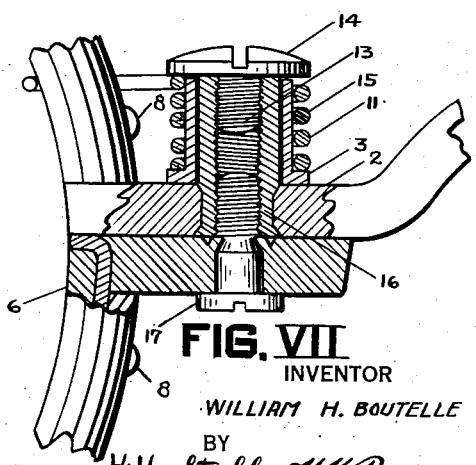
FIG. VII
INVENTOR
WILLIAM H. BOUTELLE
BY
H. H. Styll & A. R. Parsons
ATTORNEYS

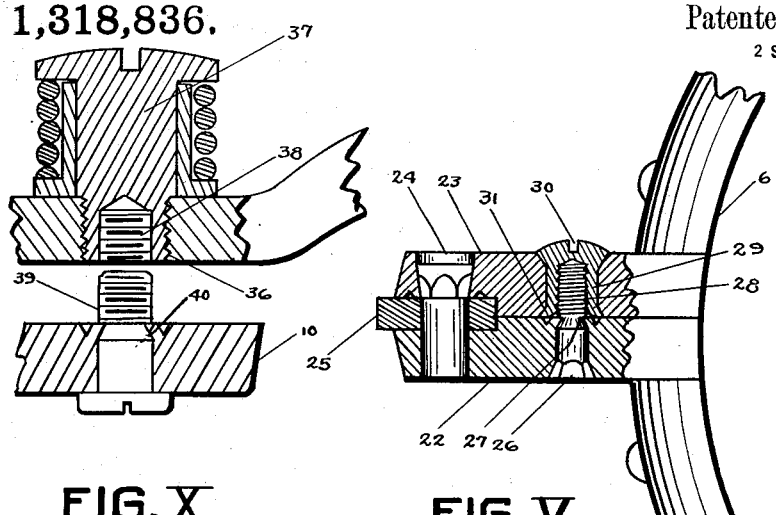
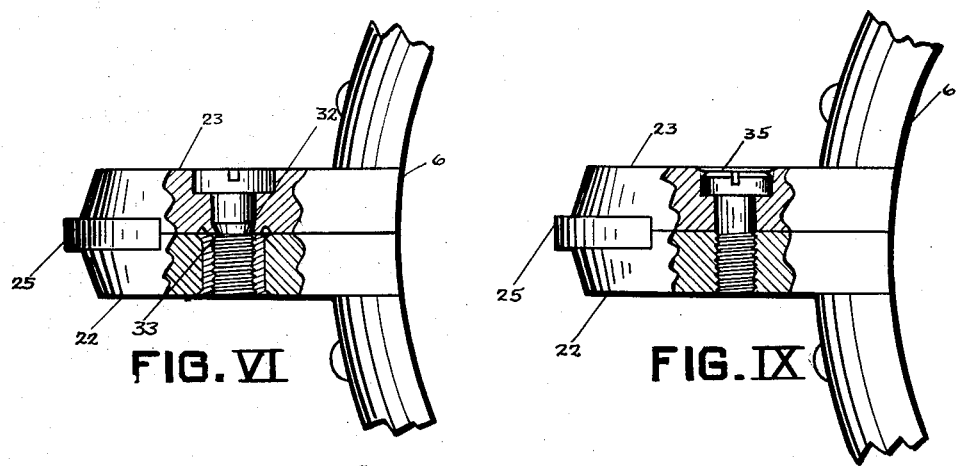
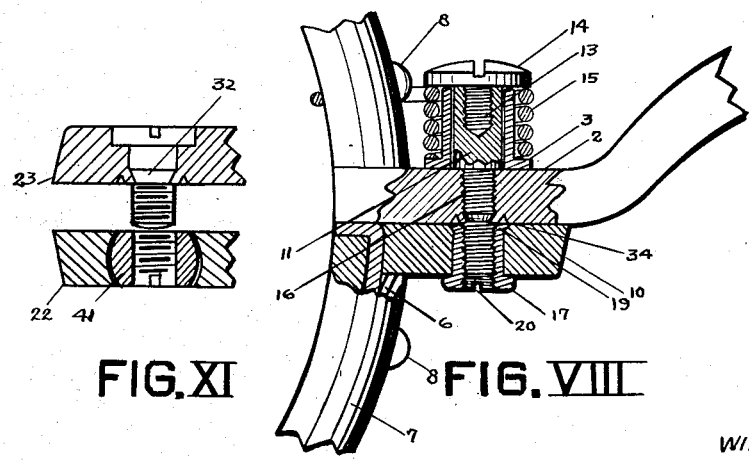

UNITED STATES PATENT OFFICE.

WILLIAM H. BOUTELLE, OF STURBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,318,836.      Specification of Letters Patent.      Patented Oct. 14, 1919.

Application filed April 29, 1919. Serial No. 293,493.

*To all whom it may concern:*

Be it known that I, WILLIAM H. BOUTELLE, a citizen of the United States, residing at Sturbridge, in the county of Worcester and State of Massachusetts, have invented certain new and useful Improvements in Ophthalmic Mountings, of which the following is a specification.

This invention relates to improvements in ophthalmic mountings and has particular reference to an improved manner of connecting the separable parts of such mountings.

I am well aware that prior to my invention various parts of ophthalmic mountings, such as end pieces, frame joints and the like, have been detachably connected as through the use of screws so that the joints might be opened for insertion of a lens or for other similar purposes. Prior to my invention, however, it has been customary to unite such parts through the medium of a screw or similar fastening device, separate from the parts, and detached therefrom upon loosening of the parts, or else in certain instances to make use of a spring, clip or the like for securing the parts together.

Both of these forms of attachment, however, have had serious disadvantages, the screw on account of its great liability to drop out of the mounting to the bench or floor, causing considerable annoyance to the workman, as well as the possibility of same being lost, and in any event delaying the speed of operation, while the clip has not commended itself for general use on account of its relatively unsightly appearance.

It is the purpose of my present invention to do away with the disadvantages experienced with these prior art constructions and to provide an improved manner of so uniting the parts in question that they may be readily separated or drawn together, as desired, but all losable loose parts associated with the joint will be eliminated.

A further object of my invention is the provision of an improved joint particularly adapted for use upon fingerpiece or similar eyeglass mountings, in that by its use an extremely small compact joint of inconspicuous nature is provided and at the same time the two ends of the frames are satisfactorily detachably connected.

Another of the difficulties which has been experienced in the past in connection with ophthalmic mountings has been due to the fact that where the parts are to be united, as in the case of end pieces on a frame, or the like, it has ordinarily been customary to form such parts, end pieces or fittings as they may be termed, of gold, gold-filled or other precious or semi-precious material, while the screws on account of the small thread, are preferably made from steel or other hard material. The result of this construction has been that when necessary to several times loosen and tighten the screw if undue strain is put upon the screw the steel threads will have a tendency to cut or strip the threads of the fittings and thus seriously impair the value of the mounting. It is, therefore, one of the further objects of my present invention to provide a construction in which both the screw and the member into which the screw fits shall be of a harder or more durable material as respects the threaded part than the material of the mounting or fitting itself and to this end I preferably make both my screw or stud and also the socket or nut into which the thread fits, of a hardened material such as steel. This also possesses another advantage in that the greater strength of this hardened insert allows of the use of a thinner sleeve member and of a lighter stud or sleeve member for the pivot than it is possible to make use of if these parts were of the less hard material, while in addition the harder pivot stud or sleeve member will to a greater degree resist wear of the parts during use of the mounting.

A further object of the present invention is the provision of a novel and improved construction particularly adapted for use in connection with fingerpiece mountings; the purpose of this novel construction being to permit and facilitate the attachment of a zylonite or similar split non-metallic eye wire to a split metallic eye wire or frame, especially for use in connection with fingerpiece mountings.

Hitherto it has been possible to produce spectacle mountings which on account of the saddle bridge form of attachment and the end pieces for the temples have lent themselves to the application of the zylonite surrounding frames without interfering with the general attractive appearance of the mounting otherwise, but this has been impossible in connection with fingerpiece mountings since it is undesirable to provide joints around the frame which are liable to be unsightly and it has been difficult to provide a joint at the center or adjacent the bridge due to the fact that most of this space has been taken up with the pivot post or screw, and it has been considered undesirable to have all of the parts retained by a single screw.

It is, therefore, as before stated, one of the principal objects of my present invention to provide a novel and improved frame for a fingerpiece or other eyeglass mounting, in which the frame joint may be adjacent and beneath the bridge in the most inconspicuous possible position, in which the parts may be satisfactorily connected for separation as desired and in which provision may be made for the securing around the metallic frame of the supplemental non-metallic frame of split form and in such manner that it will in nowise interfere either with the operation of the end piece or that of the pivoted guard lever.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a mounting embodying my improvements.

Fig. II represents an enlarged fragmentary view partially in section, showing the parts in disassembled relation.

Fig. III represents a similar view showing the fingerpiece portion of the mounting assembled but the frame joint open, to particularly bring out the independence of the two sets of parts.

Fig. IV represents a sectional view of the parts assembled as in Fig. I.

Fig. V represents an enlarged detail sectional view of one form of my improvement applied to an end piece joint.

Fig. VI represents a similar view of another form.

Fig. VII represents a sectional view of a slight modification of the structure shown in Fig. IV.

Fig. VIII represents a sectional view of a different construction of fingerpiece.

Fig. IX is a view partially in section of a modified manner of retaining the end piece screw.

Fig. X represents a sectional view illustrating a modified fingerpiece construction.

Fig. XI represents a detail sectional view of another modified form of nut.

In the drawings, in which similar characters of reference are employed to denote corresponding parts throughout the several views, the numeral 1 designates the bridge or center of a fingerpiece mounting bearing at its ends the seats or flattened portions 2, on which are pivotally mounted the guard levers 3 bearing on the one end the guards 4 and the opposite ends the fingerpiece actuating portions 5.

Secured to the ends of the bridge exterior to the guard levers are the metallic frame members 6 which are shown as encircled by the non-metallic or supplemental frame members 7 secured in position as by suitable fastening devices 8, which parts, however, form no essential portion of my present invention. With a metallic frame such as this it is necessary for the insertion of the lenses 9 that the frame be split at some point, and naturally the least conspicuous point at which to provide such a joint is immediately beneath the seat 2 of the bridge. I, therefore, preferably provide on the other end of the frame 6 the joint plate or member 10 suitably secured to the frame 6 and adapted to fit beneath the pivot seat 2. For the uniting of the parts I preferably suitably secure in the bridge portion 2 the pivot post 11 counterbored as at 12 to receive the cap screw 13 whose head 14 serves to retain in place the lever 3 and its actuating spring 15.

The opposite end of the post is reduced and threaded as in the stud 16 adapted to be engaged by the swivel nut 17 carried by the member 10. It will be noted that the member 10 is countersunk both exteriorly and interiorly, the exterior countersink serving to receive the flared head of the nut 17, while the interior countersink as at 18 serves to receive the burred or spun end 19 of the nut 17, which thus locks the nut in position within the member 10 so that the nut is free to swivel and may be rotated as by a screwdriver engaged in the slot 20, but at the same time cannot become separated from the member 10. This is a great and decided advantage over anything known in the prior art in that in opening up the joint the screwdriver is inserted in the slot 20 in the usual manner and turned to loosen and open the joint for removal of a lens as desired. The workman, however, does not have to consider the loss of a screw, nut or the like inasmuch as the nut is rotatably locked to the plate member so it will at all times be in place and the mounting may be readily assembled without any danger of dropping or losing of small parts.

It will be noted that the post 11 is rigidly associated with the bridge seat 2, if desired it being made at the portion fitting in the bridge of slightly tapered form adapted to be forced down to make a tight fit with the bridge, where it may be locked both against withdrawal and rotative movement by striking on the under side, as indicated in Fig. II, for example, to laterally displace portions of the under side of the post and cause them to bite into and interlock with the bridge seat 2, as is indicated at 21, thus enabling me to do away with the use of solder or the like in connecting the parts, and at the same time securely and rigidly unite them together.

While it will be noted that in connection with Figs. II, III and IV, I have illustrated my entire improvement, including the post employed in conjunction with a fingerpiece mounting, the joint portion of the invention is capable of numerous other uses, as for example in the form shown in Fig. V, I have shown it as employed in connection with a regular temple end piece in which the two end piece ears 22 and 23 are carried by the ends of the frame 6 and are provided with the fixed dowel member 24 carried by the ear 23 and projecting into a suitable recess in the end piece 22, this dowel forming a pivot for the temple 25.

Prior to my invention it has been customary in uniting end piece constructions of this character to make use of a separate screw passing loosely through one of the end pieces and screwing into the other. The difficulty here experienced has been that in opening up the frame there has been great liability of losing the screw or at least of the workman dropping it and occasioning delay while subsequently looking for it. With the use of my improvement, however, it is possible to entirely eliminate this difficulty, in that I secure in one of the end piece members, as in the member 22, a second dowel 26 which may have an angularly formed head, as illustrated in connection with Fig. V, if desired, and may be secured in place by staking or striking of the material of the end piece 22 adjacent the dowel to force it into the groove 27 thereof, as is clearly illustrated. This dowel in place of forming a plain pivot as does the dowel 24, is provided with a threaded portion 28 adapted to interengage with the swivel nut 29, which is similar in all respects to my swivel nut 17 previously described, having the screw-driver slot 30 at its outer end and having its inner end flared or spun as at 31 to lock the nut within the end piece to permit of its rotation but prevent separation of the parts.

With this form of the invention it will be seen that the nut is at all times held in place while readily loosenable with a screw-driver to allow of the replacement of members, as a lens or temple, as may be desired; that the dowel 24 being rigidly carried by one of the end pieces cannot become lost, while similarly the dowel 26 is secured in place in its end piece and is adapted to interengage with the nut 29, the parts thus being always in place so that when the end pieces are brought satisfactorily into correct position there are no loose or separate parts to drop out, and the lens may be readily held within the frame while the end piece members are tightened by turning of the nut 29.

As an alternative form of construction eliminating this loosening of parts, so objectionable in the handling of small articles like an ophthalmic mounting, I have shown in Fig. VI a form of my invention in which I use a swivel screw in place of a swivel nut, in this instance the screw having a circumferential groove 32 and the material of the end piece 23 being forced into the groove by striking to, as it is termed, stake the screw in place. That is to say, the material being driven or forced into the groove 32 and behind the shoulder 33 of the screw will lock the screw against withdrawing movement from the end piece 23, while permitting of its rotation to screw it into or out of the end piece 22 as may be desired. The screw will thus at all times remain in place in its end piece and all liability of its being lost and all difficulties of holding it while bringing the parts into place and starting to screw them together is eliminated and the handling of the mounting by the shop-man thus materially facilitated.

In Fig. VII, I have illustrated a reversal of certain of the features shown in Fig. IV, in that in place of forming the post 11 with a depending tang or stud 16, I make the post in the form of a simple sleeve, this structure being particularly useful on account of the hardened character of the sleeve, so that a thin walled interiorly threaded sleeve will produce sufficient rigidity and strength to permit of the interior threading and of the proper securing in place without distortion. In this form the sleeve is rigidly secured in the bridge, as by expanding or the like at the bottom, receiving the usual cap screw 13 at the top to retain the lever and parts in position, but in place of employing my swivel locking nut 17 I may employ the swivel screw 34 as in Fig. VI.

I wish to at this point call particular attention to the fact that while I have not hitherto in the specific description described my several fastening parts as formed from hardened material, such as steel or the like, since certain of the features of my invention may be carried out properly irrespective of the material, it will be understood that I preferably form all of these fastening devices from steel or other hardened material which will have increased wearing possibilities over the ordinary so termed optical metals or metals ordinarily employed in the construction of ophthalmic mountings at the present day, and I wish it to be particularly understood that any and all of the hereinbefore described forms may and preferably are formed from such hardened material and, therefore, possess the character of hardened inserts, as hereinafter particularly specified in the claims.

In Fig. VIII in place of showing the post 11 extending unthreaded through the bridge I have shown the threaded portion 16 as extending higher on the post, the post being screwed into the bridge and provided with the intermediate groove 34, into which the material of the bridge is forced to lock it against unscrewing or loosening movement and the portion 16 extending downwardly below the bridge to engage the nut or retaining member 17 which is of substantially regular construction. The operation of the structure shown in Fig. IX is quite similar to that of Fig. VI, with the exception that in place of making use of the groove 33 intermediate the length of the screw the head of the screw is beveled as at 35 and the outer face of the end piece forced inwardly thereover to engage the bevel and rotatably hold the head and thus the screw in position in the end piece 23.

In Fig. X. I have shown a slightly different embodiment of my invention, in that the bridge section 2 is tapped to receive the lower threaded portion 36 of the post 37, while the lower part of the post is interiorly tapped or threaded as at 38 to receive the upper end of the screw 39, having suitable swivel connection as through the staking of the material of the end piece 10 into the groove 40 of the screw, so that the screw is held for rotative movement with respect to the member 10, but against longitudinal disengaging movement therefrom. It will thus be seen that in this form of construction the frame may be opened and closed to insert or remove a lens as desired without any separation of the parts, while the screw 39 when tightened aids in locking the pivot post 37 in place.

Fig. XI represents a slight modification or reversal of parts of the swivel nut shown in Fig. V for example, in that the nut 41 is here made of substantially frusto-spherical form, while the material of the end piece is suitably pressed, staked or formed around the nut 41 so as to hold it in place within the end piece 23 while permitting of its rotation to screw onto the suitable stud or the like, the difference being that in this instance the nut is shown as contained within the end piece and the softer material of the end piece forced around the nut to hold it in place instead of the nut projecting and the material of the nut being displaced to retain it in the end piece.

I claim:

1. In a fingerpiece mounting, the combination with a bridge having a pivot seat, of a pivot stud secured in the seat and projecting from both sides thereof, a lever mounted on the stud to one side of the seat, means for securing the lever in place, a fitting for engagement with the pivot seat and a swivel nut carried by the fitting and adapted to engage the projection on the opposite side from the lever for securing the fitting to the pivot seat of the bridge.

2. In an ophthalmic mounting, the combination with a bridge having a seat portion, of a stud secured in the seat and projecting above and below the seat, a fitting for engagement with the seat having an aperture coincident with the stud, and a fastening device rotatably held in the aperture against longitudinal movement and adapted to engage the stud for securing the fitting in place.

3. In an ophthalmic mounting, the combination with a bridge, of a post secured in the bridge against rotation and having portions projecting above and below the bridge, both of said projections being provided with threads, a lever mounted on one of the projections, means engaging the thread of that projection for retaining the lever in place, a fitting adapted to engage the opposite side of the bridge from the lever, and a swiveled threaded fastening device carried by the fitting for engagement with the other threaded portion of the post to secure the fitting in place.

4. In an ophthalmic mounting, the combination with a frame, of an end piece member or fitting carried by each end of the frame, a threaded stud rigidly secured to and projecting from one of said fittings and a swivel nut carried by the other of said fittings for engagement with the stud to connect the parts.

5. An ophthalmic mounting including a split frame and a member carried by each end of said frame, one of the members being provided with a projecting threaded tang and the other of the members being provided with an interiorly threaded socket to receive the tang, both of said last named parts being permanently united with their respective members and one of said parts being rotatably held to permit of their screwing together.

6. In a fingerpiece mounting, the combination with a bridge fitting having a seat, of a hardened post engaged in the seat and having an upwardly projecting interiorly threaded tubular portion and a downwardly projecting exteriorly threaded tang, a lever mounted on the tubular portion, a cap member engaged with the threads of the tubular portion for retaining the lever in place, means for locking the post within the bridge, a second end piece fitting adapted to fit below the bridge, and a hardened threaded socket rotatably mounted in said second fitting and adapted to engage the threaded tang of the post for securing the fittings together.

In testimony whereof I have affixed my signature in presence of two witnesses.

WILLIAM H. BOUTELLE.

Witnesses:
ALICE G. HASKELL,
ESTHER M. LAFLER.